United States Patent [19]
Vilarel et al.

[11] 3,895,013
[45] July 15, 1975

[54] HYDROXYQUINOLINE DERIVATIVE

[75] Inventors: Danyèle Yvette Vilarel, née Sabarthez, Chantilly; Roger Lucien Debrie, Brenouille; Gérard Paul Marie Henri Loiseau, Sceaux, all of France

[73] Assignee: Pechiney Ugine Kuhlmann, Paris, France

[22] Filed: Oct. 20, 1972

[21] Appl. No.: 299,485

[30] Foreign Application Priority Data
Oct. 20, 1971 France .............. 71.37631

[52] U.S. Cl. ....... 260/270 D; 260/289 OX; 424/245
[51] Int. Cl. ............................................. C07d 33/44
[58] Field of Search .................. 260/270 R, 270 D

[56] References Cited
UNITED STATES PATENTS

| | | | |
|---|---|---|---|
| 1,129,865 | 3/1915 | Hahl | 260/270 R |
| 1,485,380 | 3/1924 | Engels | 260/270 R |
| 2,230,616 | 2/1941 | Dowzard | 260/270 R |
| 2,372,588 | 3/1945 | Carsen | 260/270 R |
| 2,799,615 | 7/1957 | Heymans | 260/270 R |
| 3,163,530 | 12/1964 | Schlesinger | 260/270 R |
| 3,247,050 | 4/1966 | Leebrick | 260/270 R |
| 3,307,970 | 3/1967 | Grier | 260/270 R |
| 3,364,149 | 1/1968 | Morgenthaler | 260/270 R |
| 3,591,591 | 7/1971 | Riviere | 260/270 R |
| 3,682,927 | 8/1972 | Carissimi | 260/270 R |
| 3,769,409 | 10/1973 | Riviere | 260/270 R |

*Primary Examiner*—Donald G. Daus
*Attorney, Agent, or Firm*—Browne, Beveridge, Degrandi & Kline

[57] ABSTRACT

5-fluoro-8-bismutho-hydroxy-quinoline which may be prepared by reacting 5-fluoro-8-bydroxy-quinoline with a bismuth salt and which is useful in the treatment of parasitoses and diseases of the digestive tube of bacterial origin in human beings.

1 Claim, No Drawings

HYDROXYQUINOLINE DERIVATIVE

The invention relates to a new derivative of 8-hydroxyquinoline, which can be used as a medicament for its antiparasitic properties.

The derivative is 5-fluoro-8-bismuthohydroxy-quinoline of the formula:

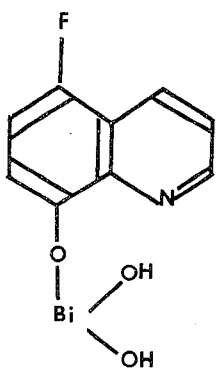

It has bacteriostatic properties which are distinctly superior to those of the known compounds, such as 5-chloro-8-bismuthohydroxy-quinoline or 5-fluoro-8-stibiohydroxy-quinoline.

It may be prepared for example by reacting 5-fluoro-8-hydroxy-quinoline with a bismuth salt. In the following Example, to which the invention is not restricted, the parts are parts by weight unless the contrary is stated.

EXAMPLE 25 parts of crystalline bismuth nitrate are dissolved in 20 parts by volume of distilled water containing 4 parts by volume of 40° Be nitric acid.

8.2 parts of 5-fluoro-8-hydroxy-quinoline are dissolved at 40°C. with stirring in 350 parts of acetone.

This solution is added to the first and the mixture is neutralised until a pH of 6.5–7 is obtained by slowing adding, with stirring, about 120 parts by volume of a 10% solution of sodium carbonate. The mixture is heated until it boils gently and left to cool. The product is filtered off, washed with distilled water until the nitrate is eliminated, and dried at 80°C. to 90°C. until constant weight is obtained 18.3 parts of a yellow powder insoluble in water are obtained.

| Elementary analysis for mol.wt. 405 | | |
|---|---|---|
| | Calculated % | Found % |
| C | 26.66 | 27.1 |
| N | 3.45 | 3.58 |
| F | 4.69 | 4.60 |
| Bi | 51.60 | 52.20 |

Pharmacological properties

Acute toxicity

The acute toxicity of the product according to the invention has been determined on the mouse CD1 taken orally. It is atoxic at the very strong dose of 9,000 mg/kg per os.

Bacteriostatic properties

The bacteriostatic activities of the product according to the invention have been compared to those of the abovementioned prior products. They have been determined in vitro against the following germs:

Gram-positive cocci: Staphylococcus aureus, Oxford strain. Streptococcus faecalis, ATCC 9790 strain (enterococcus).

Gram-negative bacilli: Escherichia coli, 416 Lausanne strain. Klebsiella pneumoniae, 444 Lausanne strain. Proteus vulgaris C.E.S. strain.

The minimal bacteriostatic concentrations after 72 hours incubation at 37°C., expressed in mg/l, are collected in the following Table.

| | Minimal bacteriostatic concentration in mg/l | | | |
|---|---|---|---|---|
| | Staphylococcus | Escherichia coli | Enterococcus | Pneumobacillus |
| 5-chloro-8-bismutho-hydroxy-quinoline | 100 | 200 | 200 | 100 |
| 5-fluoro-8-bismutho-hydroxy-quinoline | 10 | 20 | 10 | 20 |
| 5-fluoro-8-stibio-hydroxy-quinoline | 100 | 40 | 25 | 40 |

The product according to the invention thus possesses an activity 2 to 10 times more intense than closely related compounds.

Activity on bilharziosis

The schistosomicidal activity of the products is determined on mice previously infested by schistosoma mansoni according to Pellegrino [J. Pellegrino and N. Katz, Ann. N.Y. Acad. Sc., 160, 2, 429–460 (1969)]. Forty-five days after the infestation, the mice were treated daily for 5 days at a dose of 200 mg/kg per os. Three days after the end of the treatment, the animals were killed and fragments of ileum were set apart. A product is considered as active when it makes the immature eggs of these fragments disappear.

In this test at the dose of 200 mg/kg per os, the 5-fluoro-8-bismuthohydroxy-quinoline shows a schistosimicidal activity distinctly stronger than that of 5-chloro-8-bismuthohydroxy-quinoline.

Therapeutic Applications

The bismuth salt of 5-fluoro-8-hydroxy-quinoline according to the invention finds a therapeutic application in the treatment of amoebiases, bilharziosis, leishmaniosis, filariosis, trichomoniasis and nematode and cestode intestinal parasitosis. It is also indicated in all forms of diarrhoea of adults and of infants which is of microbial or parasitic origin. This product may be administered with a carrier which is pharmaceutically acceptable in the form for example of compressed tablets, lozengers, or gelatin-coated pills or also in the form of suppositories. The daily dose is between 250 and 3,000 mg/day according to the case.

We claim:

1. 5-fluoro-8-bismutho-hydroxy-quinoline.

* * * * *